(No Model.)

A. L. TEETOR.
BALL BEARING.

No. 456,664. Patented July 28, 1891.

Witnesses:

Inventor.
Abr. L. Teetor.

UNITED STATES PATENT OFFICE.

ABE L. TEETOR, OF INDIANAPOLIS, INDIANA.

BALL-BEARING.

SPECIFICATION forming part of Letters Patent No. 456,664, dated July 28, 1891.

Application filed December 11, 1890. Serial No. 374,387. (No model.)

*To all whom it may concern:*

Be it known that I, ABE L. TEETOR, of Indianapolis, in the county of Marion and State of Indiana, have invented certain new and useful Improvements in Anti-Friction Journal-Bearings of the class usually known as "Ball-Bearings," and at the present date most commonly used in bicycles and other light machinery, wherein it is desired to have the very lowest possible percentage of friction in the journals to oppose motion; and I hereby declare that the following is a full, clear, and exact description of my invention, which will be fully understood by reference being made to the accompanying drawings.

The objects of my invention are the construction of a so-called "ball-bearing" that is simply arranged, easily adjusted, practically protected from dust, and one that is proof against breakages of balls, shells, or cones, such breakages usually being caused by the balls becoming clogged with poor oil or dirt in the ball-race, balls, shells, or cones not being accurately made, or the shells or cones not being properly in line, which latter cause is often due to the improper methods of adjustment generally employed.

Figure 1:
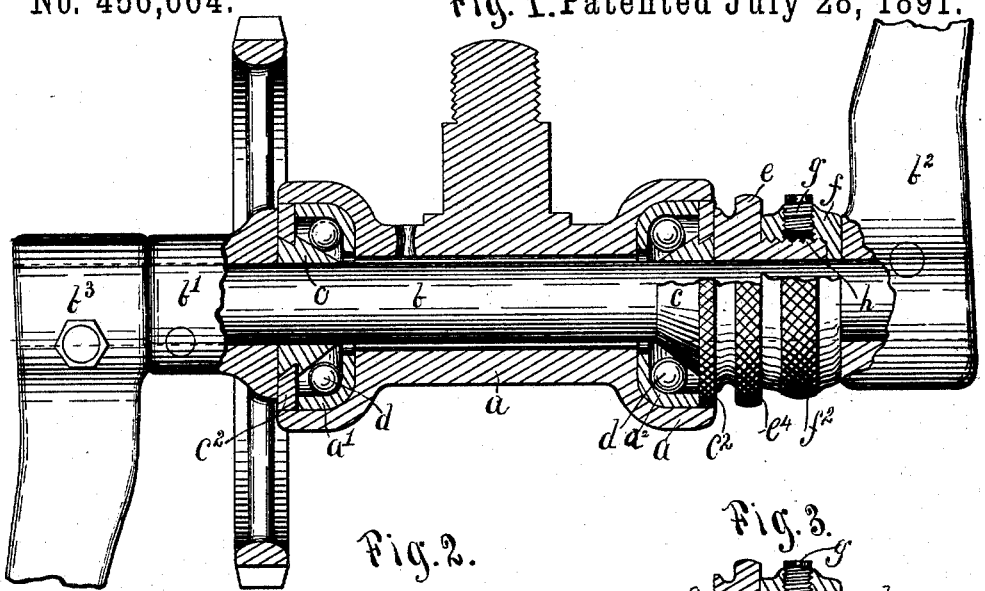
Figure 2:
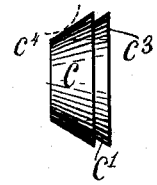
Figure 3:
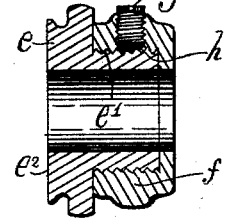
Figure 4:
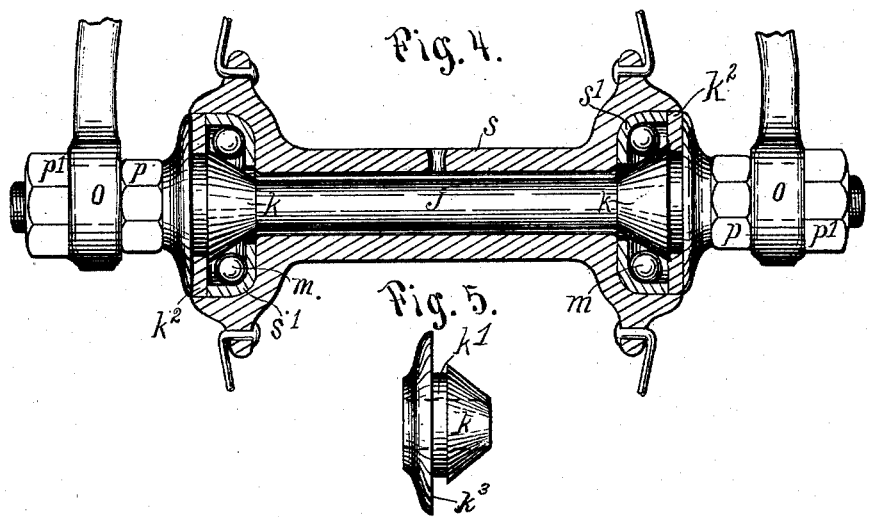
Figure 5:

In the accompanying drawings, Figure 1 is a partial transverse sectional view of a bearing, cones, and adjusting mechanism in which case the cones are designed to revolve. Fig. 2 is an adjustable cone which is movably fitted to the shaft. Fig. 3 is a horizontal sectional view of an adjuster employed in instances where the shaft is not screw-threaded. Fig. 4 is a view, sectional in part, of an axle and hub for a bicycle-wheel. Fig. 5 shows the cone as used on an axle that is screw-threaded, so that said threads, in conjunction with a nut or collar threaded to fit thereto, may be employed to adjust the cones on the axle without the use of the said adjuster, shown at Fig. 3.

$a$ represents a crank-shaft bearing such as is commonly used in bicycles known as "Safeties."

$a'$ are shells, preferably made of very hard material, such as steel hardened to a high degree, so as to provide a durable ball-race at $a^2$.

$b$ is a shaft, upon which are securely mounted a sprocket-wheel $b'$ and cranks $b^2$ and $b^3$. $c\ c$ are cones that are mounted on said shaft, one at or near each end of bearing $a$, made to fit the said shaft very closely, so as to allow, however, of rotation, if necessary, as explained hereinafter, but not to have any unnecessary play thereon. Said cone is shown in the drawings as having a straight taper of about sixty degrees; but this conical section $c$ may be more or less tapering or may be on the line of its taper lower in the center than at the ends, as shown by dotted line $c^4$.

$c'$ is a groove at larger end of conical section of cone, into which a ring $c^2$, of felt or other textile or pliable material, is pressed, resting against the end of shell $a'$, so as to preclude sand or other gritty substances from entering the ball-chamber. The outer end surfaces $c^3$ of said cones bear against rigid supports, keeping them at a proper distance from each other, one bearing against inner surface of hub of sprocket-wheel $b'$ and the other against the adjuster, which is supported by the hub of fixed crank $b^2$. $b^3$ is also a fixed crank at opposite end of crank-shaft.

$d\ d$ are the balls.

$e$ is part of the adjuster, being provided at $e'$ with an externally-threaded section, upon which is mounted an adjusting-nut $f$, internally threaded to match $e'$ and adapted to bear against the hub or crank $b^2$ and provided with a locking-screw $g$, beneath which is placed a block $h$, of fibrous or yielding material or some soft metal, so as not to injure threads at $e'$ when it is compressed thereon by said screw. Said adjuster is adapted to turn on shaft $b$. The parts $e$ and $f$ may be knurled at their larger diameters $e^4$ and $f^2$, respectively, so that they may be easily adjusted. To adjust the cones, then, it is necessary only to release the screw $g$ slightly, then with one hand hold one part $e$ or $f$ and turn the other part forward or backward with the other hand, as may be necessary to make the proper adjustment, which, when done, secures screw $g$ firmly to lock said parts, as described.

In the case above described the part in which the shells $a'$ are secured is the fixed part of the bearing or machine, while in the adaptation shown in Fig. 4 the shells are secured to the moving part. Thus $s$ is the hub of a wheel, into which are secured shells $s'$. $k\ k$ are the cones. $k'$ is the groove for the reception of the cloth or felt ring $k^2$. $k^3$ is a protecting-flange, preferably formed integrally with the cone, to protect the outside of the textile or felt disk $k^2$, thus in this case serving as such protection instead of the inner surfaces of the sprocket-wheel hub $b'$ and the adjuster $e$ in Fig. 1.

$m\ m$ are the balls.

$o\ o$ are the lower ends of the branches of a bicycle-frame fork, each having an eye or recess adapting them to fit upon the axle $j$ and to support the same, said axle being screw-threaded at each end and provided with nuts $p$ and $p'$, threaded to fit said threaded ends of axle, said nuts serving both to secure said branches $o$ to said axle and also to provide means whereby cones $k$ may be adjusted. Thus the nuts $p\ p$ act as collars, against which loose cones $k$ may bear. Hence to adjust said cones it is evident that it will be effected by the turning of either of inner nuts $p$ and locking them in such adjusted position by using nuts $p'$, acting as check-nuts pressing branches $o$ against said nuts $p$.

In the application of my loose cone ball-bearing, (shown in Fig. 1,) where it is necessary to have wheels or other parts—cranks, for instance, as shown in said Fig. 1, where it is designed that the axle or shaft with cones and the adjusting mechanism shall revolve—it is preferable to use the adjuster $e\ f$. (Shown in Figs. 1 and 3.) When the arrangement is such that the axle carrying the cones does not rotate, as is shown in Fig. 4, it is preferable to use the nuts $p\ p'$ in combination with the thread on said axle.

Now it is evident in the case shown in Fig. 1 that any irregularity in the form or construction of the said shells or cones which provide the races or ways for the balls or any irregularity in the balls that may cause the same to become pinched at any point in their rotation and passage around their course that the cones which in this case rotate with the shaft, but being loose thereon, may become momentarily checked by said pinching, while the shaft may make a partial, full, or even more than one revolution ere the said cones so checked may be released to turn again with the shaft. Several causes may be pointed out, either of which will suffice to free the cones checked in aforesaid manner, such as lateral transverse or irregular strains, jars or vibrations of whatever character, or imperfect construction of parts, any or all of which are possible and even probable to occur in the construction and use of such mechanism; and in the second case (shown in Fig. 4) the same general results will occur, while there is a movement of certain parts in this case whose counterparts remain stationary in the first case. Thus in this case the shells $i'$ of wheel-hub $i$ of course rotate and the cones $k$ remain stationary with the axle upon which they are mounted, excepting of course in case they become pinched from any cause whatever, as stated in the first case, or if the ball-race should become clogged from any cause. In either case the balls, cones, or shells would be protected from damage or breakage by the cone being caused to rotate a fraction of a revolution or more, as might be necessary, till it would become released, so that it would be allowed to remain stationary upon the axle until it might again become pinched.

It is now evident that in the use of my invention, wherein the cones or their counterparts are adapted to slip upon their mountings when unduly cramped, the breakage or injury to either shells, balls, or cones, or injurious strains upon other parts of the machines which would otherwise result are practically prevented.

Having described my invention, what I claim as new, and desire to secure by Letters Patent, is—

1. In an anti-friction journal-bearing, the combination, with an axle and a hub or box provided with interior concave ball-races near the ends thereof, of the oppositely-facing cones loosely mounted on said axle within the ends of the hub or bearing and forming with the ball-race in said hub or box an inclosure for the spherical balls, the outer ends of each cone being provided with an annular groove or recess and the annular pliable dust-shield fitted in said recesses of the cones and having rigid firm bearings against the ends of the hub or box, and the parts associated therewith, substantially as described.

2. In an anti-friction journal-bearing, the combination, with an axle and a hub or box, of the concave shells seated in the ends of said hub or box, the cones loosely fitted on the axle in relation to the shells to form an inclosure and race for the spherical balls and each cone having the annular groove at its larger end outside of the vertical line of said shells, and the pliable dust-shields seated and held in the grooves in said cones and bearing against the ends of the hub or box, the shells therein, and the parts associated with the axle and its box or hub, substantially as described.

3. In an anti-friction journal-bearing, the combination, with a shaft and a box or hub, of the adjustable cones loosely mounted on said shaft and each provided with an annular groove or seat at its larger end, the pliable dust-shield seated in said recesses of the cones and bearing against the ends of the box or hub, an adjusting flanged sleeve bearing against one of said cones, and an adjustable nut carried by said sleeve and adapted to be locked therewith, substantially as described.

4. In a ball-bearing mechanism for adjusting the cones on their counterpart, the threaded adjusting flanged sleeve adapted to be loosely mounted on a shaft, an adjusting-nut screwed on said sleeve, a locking-screw fitted in said nut and adapted to impinge against the thread or threads on said sleeve, and a yielding substance interposed between the locking-screw and the thread on the sleeve, for the purpose described, substantially as set forth.

5. In a ball-bearing, the combination, with a shaft and its bearing or hub, of the adjustable cones loosely mounted on the shaft, an adjusting flanged and threaded sleeve loosely fitted on the shaft and bearing against one of said cones, an adjusting-nut fitted on the sleeve and having a locking-screw, and a yielding substance interposed between the end of the screw and the thread on the screw, substantially as and for the purpose described.

That I claim the foregoing I have hereunto subscribed my hand this 9th day of December, 1890.

ABE L. TEETOR.

Witnesses:
WILBUR F. BROWDER,
WILLIAM F. CRAWFORD.